United States Patent [19]

Leguy et al.

[11] 4,168,567
[45] Sep. 25, 1979

[54] MACHINE TOOLS

[75] Inventors: Bernard Leguy, Meudon la Foret; Georges Marcel, Boulogne-Billancourt; Jean-Pierre Vignaud, Bailly, all of France

[73] Assignee: Regie Nationale des Usines Renault, Boulogne-Billancourt, France

[21] Appl. No.: 828,908

[22] Filed: Aug. 29, 1977

[30] Foreign Application Priority Data

Sep. 3, 1976 [FR] France ............................ 76 26642
Jun. 24, 1977 [FR] France ............................ 77 19522

[51] Int. Cl.² .......................................... B23Q 39/02
[52] U.S. Cl. .................................................. 29/568
[58] Field of Search .................. 29/26 R, 26 A, 33 R, 29/568; 198/344, 339, 412, 415, 472

[56] References Cited

U.S. PATENT DOCUMENTS

| | | | |
|---|---|---|---|
| 2,745,167 | 5/1956 | Cross | 29/33 P |
| 2,887,209 | 5/1959 | Merchant | 29/568 X |
| 3,509,619 | 5/1970 | Lipp | 29/568 |
| 3,530,571 | 9/1970 | Perry | 198/472 |
| 3,576,540 | 4/1971 | Fair | 29/568 X |
| 3,762,036 | 10/1973 | Goebel et al. | 29/568 |
| 3,851,380 | 12/1974 | Kurimoto et al. | 29/568 |
| 4,034,465 | 7/1977 | Shelton | 29/26 A |

FOREIGN PATENT DOCUMENTS 105186 12/1974 German Democratic Rep. ...... 198/415

Primary Examiner—John Sipos
Attorney, Agent, or Firm—Owen, Wickersham & Erickson

[57] ABSTRACT

A machining assembly includes a single machining unit, a plurality of multiple heads, a cross transfer device for changing the heads by moving them transversely relative to the machining unit, and means for recirculating the heads from the discharge end section of the cross transfer to the feed end section, the end sections being tiltable about a horizontal axis from a vertical position to a horizontal position so that the heads may be used with their spindles horizontal but are moved along the circulation conveyor with their spindles vertical, wherein each of said end sections ensures, in its vertical position, the direct cross transfer of the heads without intermediate movement from or towards the machining unit and, in its horizontal position, the horizontal transfer of the heads in the direction perpendicular to the axis of tilt.

7 Claims, 8 Drawing Figures

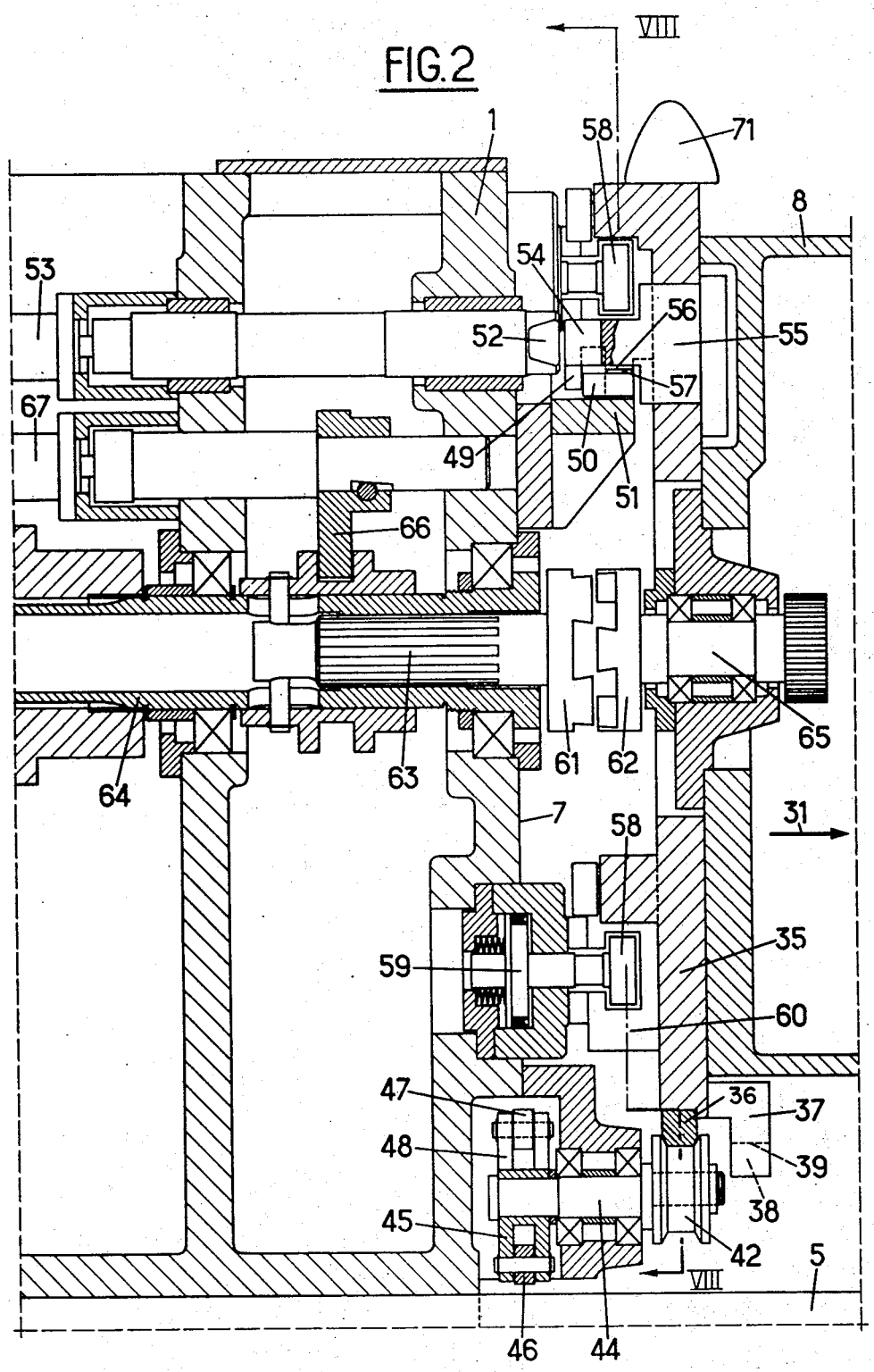

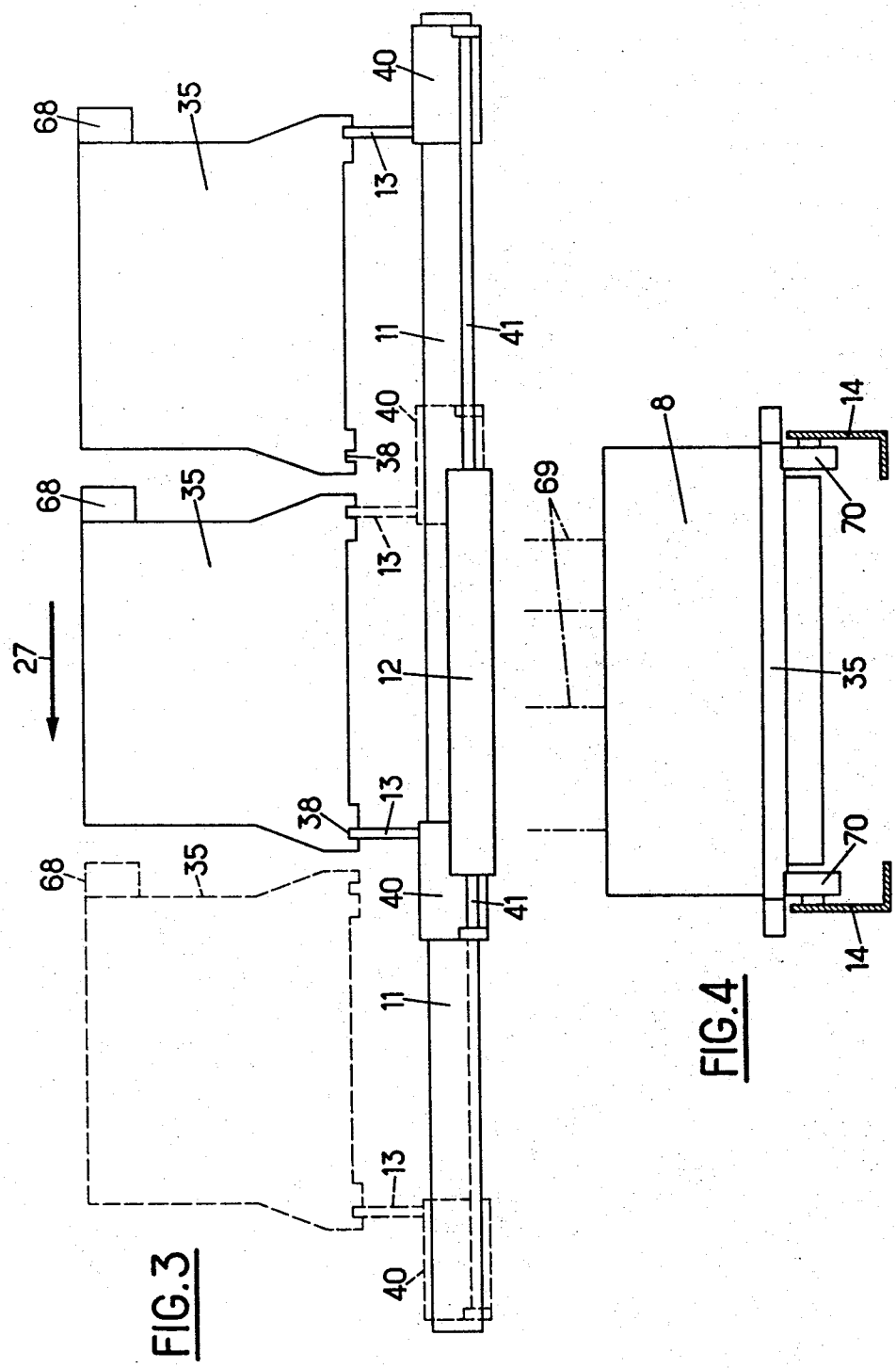

MACHINE TOOLS

This invention relates to a machine tool, which is particularly useful in the manufacture of parts in small or medium batches by means of various machining operations such as drilling, tapping, chamfering, boring, facing and milling, and/or supplementary operations such as checking, cleaning and marking.

It is known that this kind of manufacturing operation poses particular problems because of the short machining time of the various machines as compared with the time of use of these machines, with often a large number of small families of parts, and frequent modifications of these families.

Two ways of overcoming these problems are known at present. The first consists in employing numerical control machines of the machining centre type. These machines deal perfectly with the problems of great convertibility necessary for manufacturing these parts. In fact, on these machines only the holding of the part is specific. Hence, the flexibility of use is very wide, but on the other hand the production rates are very low. Because the machining operations are done one by one, the manufacturing time comprises the sum of the machining times, the mechanical times, the times for tool change and the times for changing the parts.

The second solution, which is that used in conventional transfer machines, consists in making the part to be machined pass through a series of machining units. In this solution, the times for all of the operations are not additive. The cycle time is the sum of the nominal machining time, the maximum mechanical time and the time for transferring the parts. Hence this solution enables high rates to be achieved, and is more suited to the manufacture of parts in large batches. On the other hand, the machining programme is necessarily fixed, and the possibilities of convertibility are practically nil.

An object of the present invention is to minimise the disadvantages of the two aforesaid solutions by producing a machine which is particularly adapted to the problems posed in the manufacture of parts in small or medium batches, the machine having a high degree of convertibility comparable with that of numerical control machines, and having high use factors comparable with those of special transfer machines, even though the required rates are lower.

A machining assembly in accordance with the invention operates by a sequence of operations and comprises a plurality of heads equipped with at least one working spindle each; a machining unit including means for causing rotation and feeding of the spindles with respect to the successive parts; a cross transfer device for ensuring simultaneously the positioning on the machining unit of another head and the discharge of the preceding head; means for circulating the heads from the discharge end of the cross transfer back to the feed end; feed and discharge end sections of the cross transfer tiltable about an axis so that the heads are used with their spindles in one plane but are circulated with their spindles in another plane, the said end sections ensuring the direct cross transfer of the heads without intermediate movement from or towards the machining unit, and ensuring the circulating transfer of the heads in a direction perpendicular to the axis of tilt.

With this assembly two main functions are ensured, the first being the simultaneous transverse displacement of two machining heads when the vertical front face of the machining unit is in alignment with the feed and discharge end sections of the cross transfer, which are in the vertical position, and the second being the guidance of the heads in this same displacement with the aid of means which also allows the movement of the heads in a direction perpendicular to the previous one when said end sections are in the horizontal position and which at the same time allows at the machining unit the usual auxiliary operations of positioning, clamping and coupling to be carried out.

All these operations could alternatively be carried out by a collection of conventional mechanisms, but this will result in a relatively complicated assembly. Hence, another object of the invention is to carry out these two main functions with the aid of simple means, that is to say means which reduce to a minimum the number of mechanisms and control means.

The first function is ensured, in preferred embodiments of the present invention, by making each multiple head integral with a baseplate which is vertical in the machining position, the bottom edge of which constitutes a bottom guide rail, and which includes at the two horizontal ends extensions which reach forwards and downwards, each of these extensions including a striker plate having a vertical notch which is open downwards, the top end of which is at a level not higher than that of the bottom edge of the rail, the two striker plates in the same baseplate being spaced at a certain pitch common to all the plates, and by employing two movable catches each integral with the end of one rod of a double-rod jack placed underneath the guide rails for the machining feed of the machining unit, the stroke of this jack being that necessary for the passing of a multiple head both from the feed end to the machining unit and from the machining unit to the discharge end, and the constant pitch between the two catches being excatly equal to the pitch between the two striker plates plus the said stroke, the motions of engagement and disengagement of the catches in the keepers being carried out exclusively for the multiple heads in position on the machining unit, by approach or return movement of the machining unit, and for the multiple heads in position on the transfer end sections, by the tilting motion of these end sections.

The second function, that is to say the transverse guidance of the multiple heads, is carried out with the aid of movable rails integral with the baseplate and cooperating with idler rollers of fixed position, one of these rails consisting of the bottom rail previously mentioned, located under the bottom edge of the baseplate and cooperating with a series of idler rollers on horizontal axes mounted preferably eccentrically in order to permit a slight vertical retraction, whilst the second rail is a top rail cooperating with idler rollers with vertical shafts, said shafts being mounted on bottom supports whilst the top rail makes contact with these rollers by a substantially vertical face located in the vicinity of the bottom edge of the rail between the rollers and the machining unit, this rail being joined to the baseplate by a bracket which passes round the rollers at the top portion. The various rollers, both bottom and top, are uniformly distributed at intervals of less than half the horizontal length of the baseplate so as to ensure continuity of action of the whole. The top rollers as well as their brackets being spaced at suitable places, especially in the centre and at the ends, in order to enable free passage of the various projections from the baseplate, consisting of the positioning, clamping and coupling devices, at the time of said perpendicular motion in the tilted position.

Embodiments of the invention will now be described, by way of example, with reference to the accompanying drawings, in which:

FIG. 2 shows a vertical cross-section of the combination of a multiple head and the machining unit;

FIG. 3 is a simplified first elevation of the assembly showing particularly the position of notched plates in the assembly and the movement of cooperating catches;

FIG. 4 is a partial vertical section through a conveyor for moving the heads;

Figure 1:
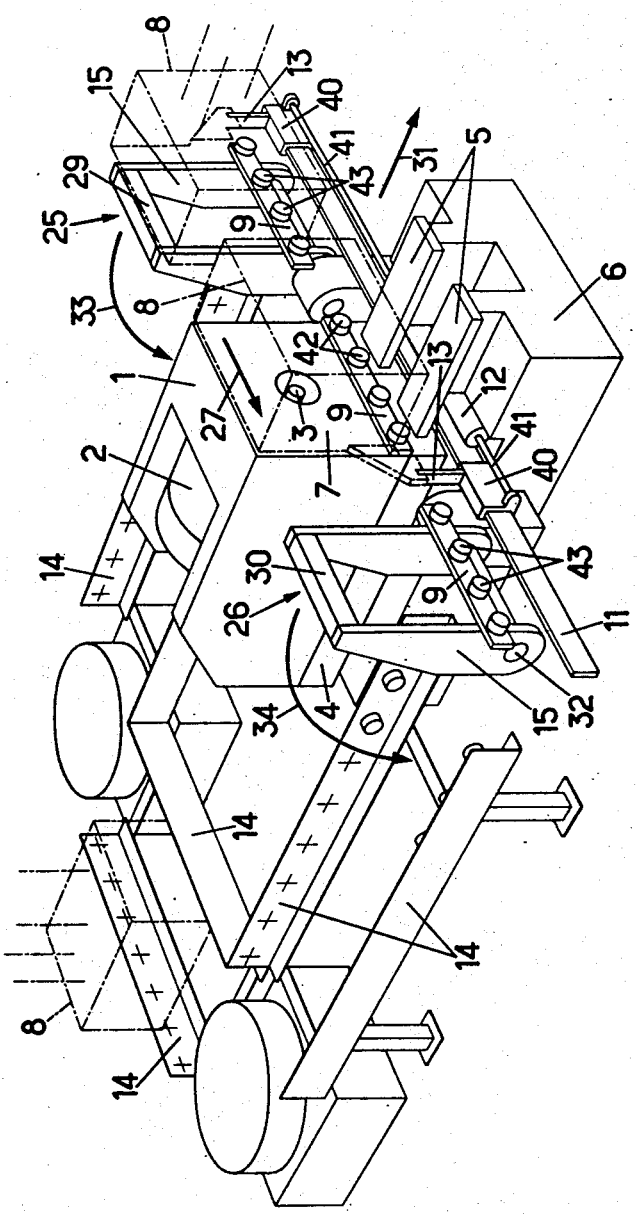
FIG. 1 is a perspective view of a machining assembly providing horizontal displacement of a machining unit along one axis.

As shown in FIG. 1, a machine in accordance with the invention comprises a machining device comprising a console or machining unit 1 equipped with a driving unit 2 with its coupling device 3, the console or unit 1 being supported by an advancing carriage 4 capable of sliding on guides or slides 5 supported by a frame 6, with an appropriate mechanism, not shown, for displacing the panel 4 on its guides 5 to produce the forward movement.

Against the front surface 7 of the machining unit 1, a head 8 (shown in broken lines in FIG. 1) is mounted, and is provided with at least one working spindle. The spindles rotate at their appropriate speed through the intermediary of a shaft driven by the coupling device 3.

In accordance with the invention, for each machining unit 1 described above, a plurality of heads such as 8 is provided. Each spindle is equipped with an appropriate machining or control tool, which remains in place during the entire execution of a series of pieces or of an adjacent series. Thus, any changes of positions or between axes are replaced by an exchange of heads.

This exchange is automated. It comprises the unclamping, the uncoupling, the transfer, the clamping and the coupling of the heads 8 on the machining unit. A lower support device 9 and lower gliding device 10 make possible, by a transfer system, the simlultaneous displacement of the uncoupled head 8 of the machining unit 1 and of the head 8 replacing it.

The transfer system may, for example, be provided with a rail 11 carrying two hand catches 13 and controlled by a jack 12. This system may be replaced by another suitable mechanism. It suffices, in accordance with the invention, to organize a device for closed-circuit rotation in order to recycle a succession of heads such as 8, whose number depends on the nature and quality of the machining to be carried out.

For practical reasons, it is considered suitable to obtain movement of the heads 8 by means of simple driving roller or sprocket conveyors 14 by, for this purpose, placing the heads 8 in a horizontal position, with their spindles vertical, as for example in the present case where the heads rest on their coupling surface with the tools up in the air. For this purpose, it is sufficient in accordance with the invention to place on the frame 6, on both sides of the slides 5, two tilters 15 carrying the outermost portions of the supports 9 and of the slides 10 and being capable of tilting backwardly under the effect of a suitable control in order to bring the heads into the position indicated hereinabove.

Thus, the circuit may simply comprise three successive portions of the circulation conveyor 14 disposed so as to complete the rectangle, with pivoting devices 16 in the angles. In this manner, it is always possible to modify this circuit by lengthening, if necessary, the lateral tracks of the conveyor in order to receive the number of heads 8 desired to satisfy the most exacting machining cycles. Inversely, the same machine may function perfectly with a much smaller number of heads for simpler machining cycles, the conveyors 14 insuring their functioning without necessarily being completely filled.

FIG. 1 shows a machining unit 1 located directly between cross transfer end sections, of which the feed end section is 25 and the discharge end section is 26, the direction of transfer being that represented by an arrow 27. The machining unit 1 is represented in its furthest retracted position, being the position in which its front face 7 is lying in the same vertical plane as the front faces 29 and 30, respectively, of the transfer end sections 25 and 26 when both end sections are in the vertical position.

From these positions the machining unit is capable of being moved on slides 5 in the direction of approach and then of machining feed shown by an arrow 31, and of being moved in the reverse direction during return to the starting position which follows the machining phase. The transfer end sections 25 and 26 are movable from the position shown by a tilting motion about a common axis 32 in the direction shown by arrows 33 and 34, which motion brings their faces 29 and 30 into the horizontal position. Naturally, the reverse motion brings them back to the vertical.

It is in the position shown in FIG. 1 that the cross transfer operation takes place, which is intended for changing the multiple heads. During the course of the cross transfer the head 8 located in the central position on the front face 7 of the machining unit 1, which head has just finished its work, must be moved in the direction 27 on to the discharge end section 26 which is empty, at the same time as the next multiple head 8 which is on the feed end section 25 of the cross transfer is to be brought, in the same direction, into the central position on the machining unit. Hence, it is necessary to ensure both the simultaneous horizontal displacement of the two multiple heads 8, and their correct guidance during the course of this displacement. To do that, each multiple head 8 is fixed on to a baseplate 35, which may be seen especially in FIG. 2, the bottom edge of which baseplate includes a bottom horizontal rail 36, and in the vicinity of each of the horizontal ends a portion 37 extending the baseplate forwards and downwards. Each of these extensions includes a notched plate 38 (see also FIG. 3) which has a substantially rectangular notch the top end 39 of which is at a level not higher than that of the bottom edge of the rail 36.

The two notched plates 38 cooperate with two vertical catches 13 which are carried by respective carriages 40 sliding on a supporting rail 11, each carriage 40 being fixed to an end of one of the rods 41 of a double-rod jack 12, the body of which may be placed at the bottom of the slides 5 underneath the way for the machining unit 1.

As may be seen in FIG. 3, the two notched plates 38 of one and the same baseplate are located at a certain pitch which is slightly less than the maximum overall spread, in the horizontal direction, of the baseplate and the multiple head, the stroke of the jack 12 being slightly greater than this overall length and of a value suited to the relative positioning of the end section 25 with respect to the unit 1, and of the unit 1 with respect to the end section 26. In addition the two catches 13, locked together by the carriages 40 and the rods 41, are at a distance apart which corresponds very accurately with the sum of the picth indicated previously and the stroke of the jack.

The position of rest of the two catches 13, shown in solid lines in FIG. 3, is such that during the return motion of the machining unit 1 in the direction opposite to the arrow 31 the notched plate at the left of the baseplate 35 corresponding to the multiple head mounted upon this unit becomes engaged, by this motion only, with the catch 13, and that the raising motion of the feed end section 25 in the direction opposite to the arrow 33 produces the engagement of the notched plate on the right of the baseplate 35 of the next multiple head with the right hand catch 13.

The jack 12 then makes a complete stroke over to the position shown in broken line in FIG. 3, and consequently, thanks to the indicated dimensioning of the strokes and pitches between the notched plates, brings the new head 8 into the central position and the head which has just finished its work into position at the left on the discharge end section. As soon as this motion of the jack 12 is completed, the machining unit 1 resumes its motion of approach, then of machining, bringing it about that the corresponding baseplate disengages its notched plate on the right from the catch on the right, at the same time as the two transfer end sections 25 and 26 carry out their tilting action in the directions 33 and 34 so that the left hand notched plate on the left hand baseplate releases the left hand catch. The return motion of the jack 12 into the rest position can then take place freely during the start of the machining cycle, without any mechanism having to be provided for retraction of the catches. It may be seen in particular that between the end of the rapid return of the machining unit and the start of the rapid approach of this unit with a view to the next machining operation, the only time of immobility is that necessitated by the stroke of the jack 12, which corresponds with an extremely brief loss of time.

Furthermore, in order to ensure the function of transverse guidance of the multiple heads in the preceding motion, instead of employing slides moving in guides or movable rollers rolling on fixed rails, movable rails are employed which are integral with the multiple heads and move over idler rollers which are fixed in position. One of these rails consists of the bottom rail 36, already mentioned, which is located at the bottom edge of the baseplate 35 and which, due to the conditions imposed upon the positioning of the notched plates 38 can pass freely over the catches 13 during the approach and return motions. This rail cooperates with a series of horizontal-axis rollers 42 located at the bottom of the machining unit 1, as well as similar rollers 43 located at the bottom of the transfer end sections 25 and 26.

All of these rollers 42 and 43 are mounted idly on their respective shafts and serve to carry the weight of the multiple head during its transverse displacement. In addition, the rollers 42 are preferably mounted on shafts 44 (FIG. 2) which have a portion journalled in the bottom of the machining unit 1. This portion and the portion on which the rollers 42 rotate are mutually eccentric. The shafts 44 can be driven in rotation simultaneously through a certain angle by means of levers 45 keyed to their rear ends and by a coupling rod 46 constituting with these levers a multiple parallelogram, the whole being rotated by a jack 76 which acts via a connecting rod 47 connected to the top end 48 of a lever 45a. Actuation of this jack produces lowering of all the rollers 42 below the normal rolling level, due to the eccentricity of the shaft portions.

The baseplate 35 also includes a top rail 49 (FIG. 2) which includes a horizontal tie portion connected to the baseplate and a vertically descending edge which is located between rollers 50 and the front face 7 of the machining unit. The rollers 50 run on vertical shafts which are mounted on brackets 51 integral with the machining unit 1, and further brackets on the front faces 29 and 30 of the transfer end section 25 and 26. The upper rollers 50 cooperate with the top rail 49 to ensure retention of the baseplate whilst opposing the tilting of the corresponding multiple head during cross transfer motion.

The assembly further includes a series of auxiliary devices for carrying the operations of horizontal and vertical centring and clamping and coupling of each multiple head on to the machining unit. Horizontal centring, which occurs first, is ensured by a centre 52 which slides in and out of the machining unit 1 under the action of a jack 53. The end of this centre has a prismatic surface with vertical generatrices and is of trapezoidal horizontal section, and is intended to be inserted into a notch 54 of corresponding shape formed in a part 55 integral with the baseplate 35.

After the multiple head has been brought into a suitable position on the machining unit 1 by rolling on the rollers 42, 43 and 50 under control of the corresponding catch 13, the centre 52 comes into action and positions the machining head with great accuracy on the machining unit in the transverse direction. Next, the jack previously referred to but not shown causes rotation of the eccentric shafts 44 and lowering of the rollers 42, thereby enabling horizontal bearing surfaces 56, integral with the baseplate and at its two horizontal ends, to come to rest on corresponding bearing surfaces 57 integral with the machining unit. This ensures accurate positioning of the head in the vertical direction.

The whole of the baseplate is then clamped against the machining unit by clamping heads 58. The clamping heads are actuated by a jack 59 and cooperate with coupling parts 60 in the form of sections of slide located substantially at the four corners of the baseplate 35 with merely a groove opening out in the two horizontal directions and enabling the clamping head 58 and the rod of the jack 59 to pass through.

Finally, coupling of the main drive transmission between the machining unit 1 and the multiple head 8 is effected by two mating dog-clutch parts, one of which, 61, is integral with a shaft 63 splined to a driving shaft 64 of the machining unit. The other clutch part 62 is integral with an input shaft 65 to the multiple head. In order to ensure engagement of the teeth of the dog-clutch parts and disengagement prior to the horizontal transfer displacement of the heads, the shaft 63 is movable axially under the action of a fork 66 which is actuated by a jack 67.

Hence, it may be seen that all these auxiliary devices constitute projections both from the rear face of the baseplate 35 and from the front face 7 of the machining unit. With a conventional guidance device these projections would prevent the motion perpendicular to the cross transfer in the lying-down position from occurring, and would compel a supplementary disengagement motion perpendicular to the faces 35 and 29 or 30 to be provided. However, with the arrangement in accordace with the invention, that is to say with movable rails rolling on fixed guide rollers, it is possible to position the rollers, especially the upper rollers 50, in such a way that they allow between them a space for the projections from the baseplate. For this purpose the rollers 50 are, for example, four in number per location, both on the front face 7 and on the faces 29 and 30, and they are grouped two and two on sections of the brackets 51 which allow between them both a sufficient central clearance for the movable dog-clutch part 62 to pass through and side clearances for the coupling parts 60 located at the bottom of the plate 35.

In this way, the motions of engagement of each multiple head on to the feed end section 25 in the lying-down position, and of release of another multiple head on the discharge end section 26, likewise in the lying-down position, may be effected freely without providing any supplementary retracting or release mechanisms. There is only provided, as may be seen in FIG. 3, at one end of the top edge of each baseplate 35, a connection block 68 for the electrical and hydraulic connections, which cooperates with a fixed-station coupling device on the machining unit 1, which can be displaced by a jack for ensuring coupling and uncoupling of these connections.

It should be realised that during displacement of the multiple heads in the cross transfer direction 27, the two heads present are displaced simultaneously by the two catches 13 which are integral with one another, so that in no case can there be interference between the two heads. In addition, during progress of the heads along the circulation conveyors 14 (FIG. 4) the heads are arranged with their tools 69 uppermost, these tools thus being protected whatever their spread. During these movements, each baseplate 35 rolls on side rollers 70 of the conveyors 14 with suitable means for lateral guidance, and resilient stops 71 provided at the top part of each baseplate 35 avoid clashes between the various baseplates.

In order to reduce the spread of the device, the top rail 49 is formed in two sections to allow between them the room necessary for the part 55 which has the notch 54 for centralising the centre 52.

It may thus be seen that all the functions, especially those of driving and guidance during cross transfer, are ensured by use of the invention by extremely simple means allowing mutually perpendicular motions in the transverse and tilted back positions without additional complication.

Figure 5:
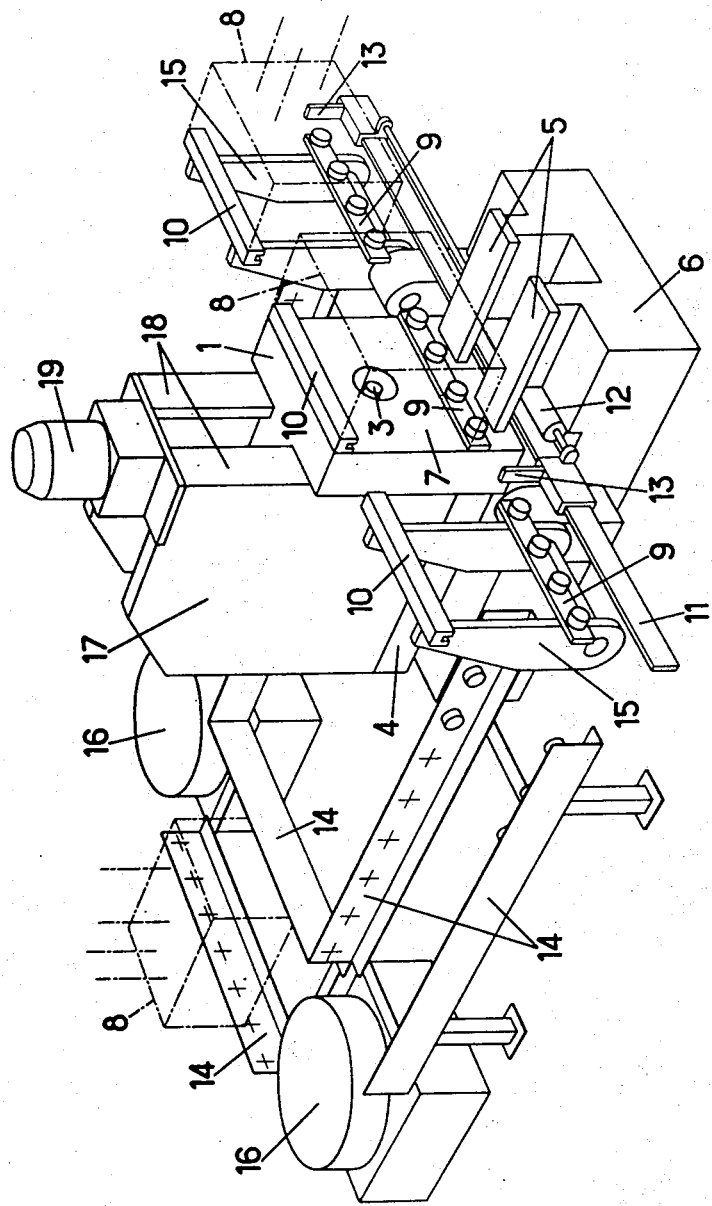
FIG. 5 is a perspective view of a similar machining assembly providing bi-axial (horizontal and vertical) displacement of the machining unit with or without positioning.

In an alternative embodiment shown in FIG. 5, there has been added between the slide bed 4 and the machining unit 1 a bracket 17 provided with vertical slides 18 with a drive 19 for producing vertical displacement of the machining unit 1, either for adjustable positioning of the various heads with respect to the workpiece or for carrying out a vertical feed motion, for example in certain operations of milling or facing. Rapid return of the machining unit into the starting position is obtained by actuating simultaneously the rapid vertical return and the rapid horizontal return, so that there is no additional lost time. Hence all the advantages previously explained remain valid.

Figure 6:
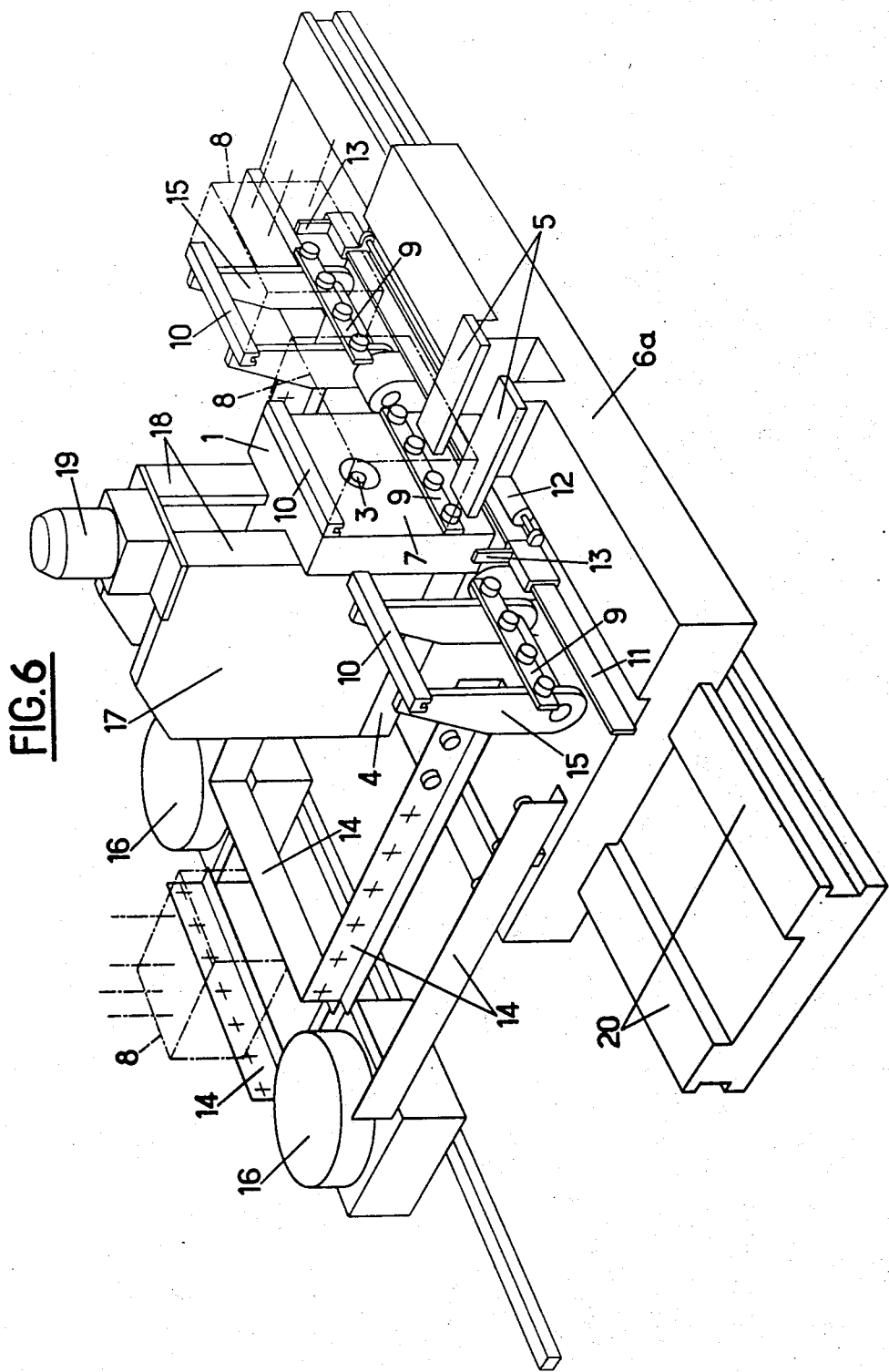
FIG. 6 is a perspective view of a machining assembly providing tri-axial (bi-horizontal and vertical) displacement of the machining unit with or without positioning.

In another embodiment shown in FIG. 6, the assembly shown in FIG. 5 is integrated with a support 6a. The apparatus is then capable, additionally, of being moved on fixed cross-slides 20 under the action of a suitable drive mechanism (not shown) in order to add a further possibility of transverse displacement of the machining unit. The changing of the heads may be carried out whatever the position of the movable support 6a on the cross-slides 20. However, the displacement of the movable support required for the machining operations of the next cycle may take place immediately after the rapid return of the machining unit, and so do not introduce any additional dead time.

Hence, the machine operates by a programmed succession of multiple operations in the same fashion as a conventional transfer machine, but with this difference that here the various multiple operations succeed one another in time instead of succeeding one another in space. Hence the rate of production of parts is necessarily lower because of the single work station, but the productivity rate of the machine remains altogether comparable with that of transfer machines carrying out, under the same conditions, the same series of multiple operations. The machine in accordace with the invention has the advantage that the times taken for the various multiple operations may be different from each other, whereas in a conventional transfer machine the times are of necessity tied to the longest operation.

When the parts to be machined must undergo machining in various directions, that is to say on various faces, each part may naturally be clamped on to a rotary table with automatic control in order to do away with the dead times which the changes in orientation of the parts would necessitate.

Figure 7:
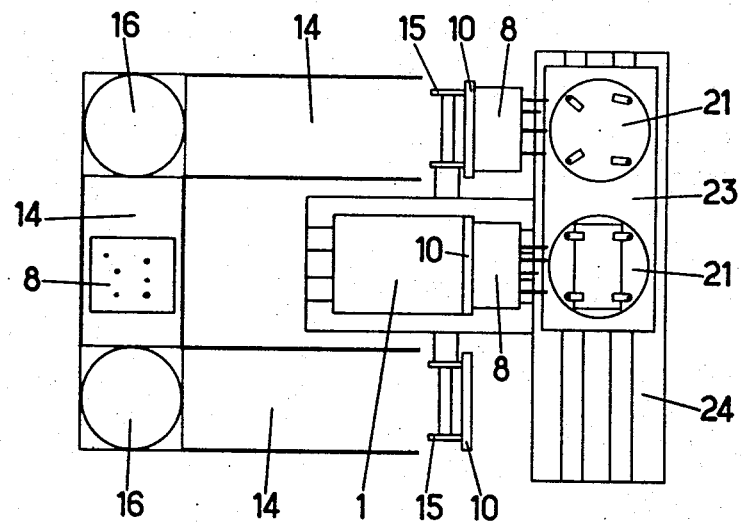
FIG. 7 is a schematic plan view showing a workpiece-holder device connected to the machining assemblies represented in FIGS. 1 and 2 and enabling certain dead times to be eliminated.

Finally, the dead times corresponding with the positioning and removal of the parts can be eliminated by employing an assembly as shown in FIG. 7. Two identical rotary tables 21 are provided to receive the parts and to offer the various faces which must be machined to the machining unit 1. These two tables are, in turn, mounted on a bed 23 which can be moved by transverse sliding along a support 24. Hence, as soon as one part is finished, the bed is moved in one direction or the other alternately in order to bring a new workpiece blank opposite the machining unit at the same time as the change of head is effected to commence another cycle of multiple operations. Hence, there is available all the time needed for the various multiple operations performed on the various faces of one workpiece, for ensuring the unloading of the part machined previously, and for the loading of another blank.

Naturally, several machining assemblies as just described may be employed together, if necessary, acting upon one and the same part, or on parts succeeding one another in a short transfer line, if it is desired to increase productivity. For example, for a part necessitating machining on two opposite faces, two identical assemblies may be employed facing one another in order to double productivity and do away with the need to turn the parts round.

We claim:

1. A machining assembly which operates by a sequence of operations upon each of a series of successive parts, the assembly comprising
   a plurality of heads equipped with at least one working spindle each,
   a machining unit including means for causing rotation of the spindles and means for causing return and approach motions of said unit with respect to the successive parts,
   a cross-transfer device for ensuring simultaneously the positioning in a central position on the machining unit of a head from a feed end and the discharge of the preceeding head to a discharge end,
   means for circulating the heads from the discharge end of the cross transfer device back to the feed end, and
   said cross transfer device including feed and discharge end sections at said feed and discharge ends tiltable about an axis so that each of the heads is used with its spindle in one plane but is circulated with its spindle in another plane, the said end sections ensuring the direct cross transfer of the heads without intermediate movement from or towards the machining unit, and ensuring the circulating transfer of the heads in a direction perpendicular to the axis of tilt, said feed and discharge end sections being movable together between a vertical position and a horizontal position,
   each head being attached to a respective baseplate having a notched part which cooperates to engage with and release from a catch mounted on a carriage mounted on said assembly for transverse movement of the heads,
   the engagement and release of the catches and the notches being achieved exclusively in the central position on the machining unit by the return and approach motions of the machining unit, and in the end positions by the motions of raising into the vertical position and of tilting into the horizontal position of the feed and discharge end sections of the cross transfer device.

2. An assembly as claimed in claim 1, wherein the guidance of the heads during the course of cross transfer is ensured by top and bottom rails integral with the baseplate which cooperate with idler rollers on the front face of the machining unit and on the faces of the tilting transfer end sections, the bottom rail comprising the bottom edge of the baseplate which cooperates with lower rollers with horizontal axes, and the top rail cooperating with vertical axis rollers and being orientated in a direction such that it ensures retention of the head against tilting about the bottom rail.

3. An assembly as claimed in claim 1, including a movable centre which slides into engagement with a recessed part of the head assembly to ensure horizontal centring of the baseplate in the working position.

4. An assembly as claimed in claim 2, wherein the top rail for the upper rollers include bearing parts with substantially horizontal surfaces of contact which interengage for ensuring vertical centring of the baseplate, this centring being allowed by the mounting of the bottom rollers which are located on the machining unit on eccentric shafts which are simultaneously rotatable to lower those rollers.

5. An assembly as claimed in claim 1, comprising a single head transfer and circulation circuit in a horizontal plane, wherein the heads are equal in number to the number of multiple operations which a workpiece machining cycle includes and the heads succeed one another on the circulation means in the order necessitated by these operations, in such a way that the cross transfer advances by only one step at each multiple operation and that all of the heads makes only one complete circulation per machining cycle, the circuit having for this purpose a total capacity sufficient for receiving the number of heads needed for the most complicated machining sequences by multiple operations.

6. An assembly as claimed in claim 5, wherein the circuit has a polygohal route formed of rectilinear sections of circulating conveyor with driving rollers, and wherein the circuit includes elements for change of direction at the corners, and at least one station for introduction and withdrawal of the heads enabling changes of number, types and order of succession of the heads for adaptation to any new machining programme.

7. A machining assembly which operates by sequences of multiple operations with the aid of a plurality of machining heads equipped with at least one working spindle and a single machining unit, including in combination
   means for rotating the spindles and means for feeding the heads in approach and return motions with respect to the successive parts to be machined,
   cross-transfer means for ensuring simultaneously the positioning at a central position on the machining unit of a head and the discharge of the preceding head said cross-transfer means having a feed end section and a discharge end section, and
   means for circulating the heads forward and interconnecting the two end sections of the cross transfer so as to recirculate the heads,
   the feed and discharge end sections of the cross transfer being tiltable about a horizontal axis from a vertical position to a horizontal position in such a way that the heads are used with their spindles horizontal but are moved on the circulating means with their spindles vertical,
   each said end section ensuring in its vertical position the direct cross transfer of the heads without intermediate movement from or towards the machining unit, and in its horizontal position the horizontal transfer of the heads in the direction perpendicular to the axis of tilt,
   wherein each head is integral with a baseplate which is vertical in the working position and includes a bottom edge and two parts located at the ends of the said edge and extending forwards and downwards from said bottom edge, each of these parts including a plate having a notch at the bottom, these two notches lying at a certain pitch nearly the length of the baseplate,
   the said notched plate cooperating with two vertical catches the top ends of which are at a level lower than that of the said bottom edge, each of these catches being integral with a carriage mounted on said assembly for guidance in the transverse direction, which carriage is integral with the end of one of the rods of a double-rod jack the stroke of which corresponds with the length of the transfer, being slightly greater than said length of the baseplate,
   the two catches thus made integral with one another being located at a distance apart exactly equal to said pitch plus said stroke and positioned for cooperating with said notched plates to achieve engagement and release therebetween, the mutual engagement and release of the catches and notched plates being achieved exclusively in the central position on the machining unit by the return and approach motions of the machining unit and in the end positions by the motions of raising into the vertical position and of tilting into the horizontal position of said feed and discharge end sections of the cross transfer.

* * * * *

UNITED STATES PATENT AND TRADEMARK OFFICE
CERTIFICATE OF CORRECTION

Figure 8:
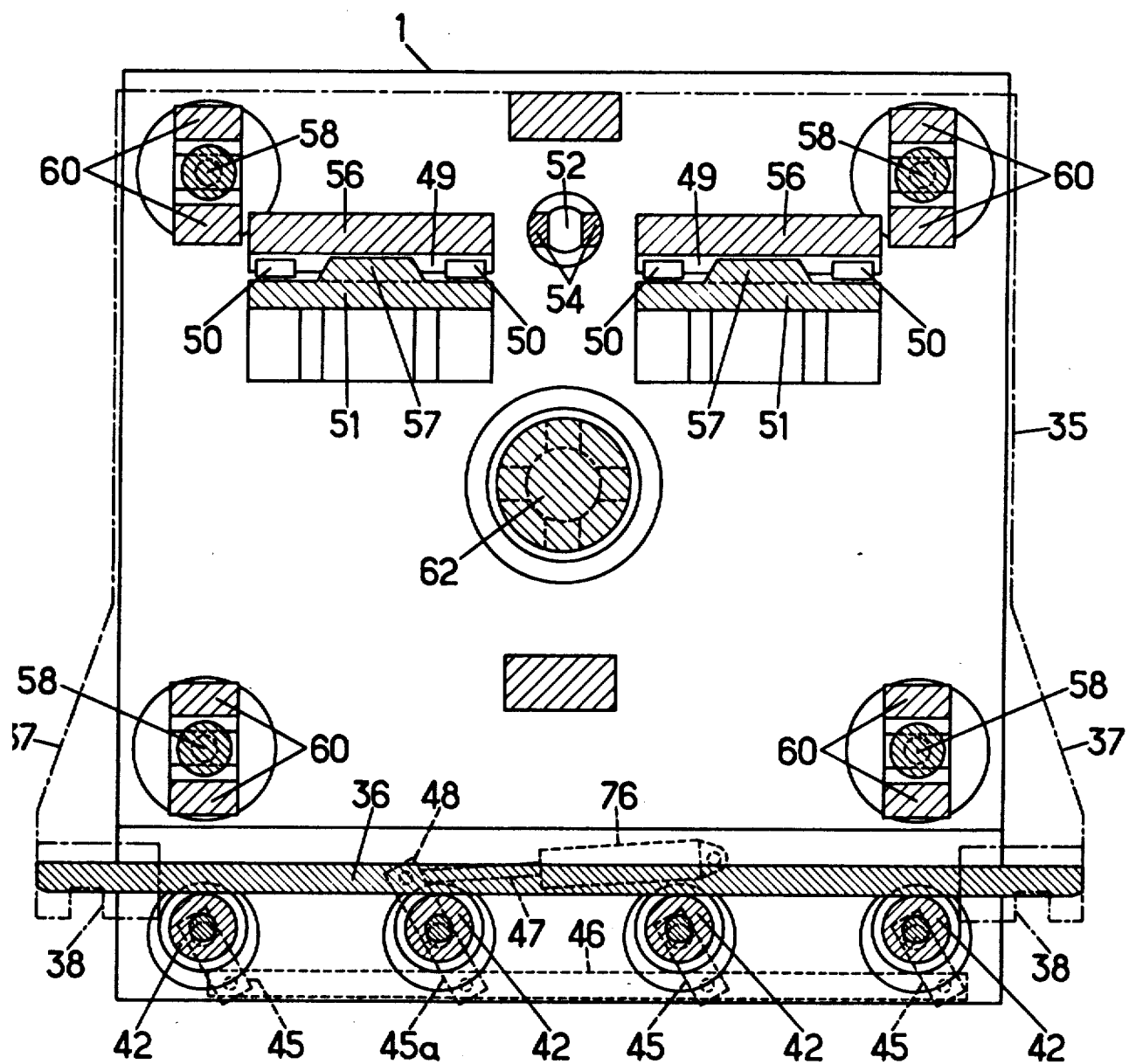
FIG. 8 is a view in section taken along the line VIII—VIII in FIG. 2.

PATENT NO. : 4,168,567
DATED : September 25, 1979
INVENTOR(S) : Bernard Leguy, et al It is certified that error appears in the above—identified patent and that said Letters Patent is hereby corrected as shown below:

The attached sheet of drawing containing FIG. 8 should be added as sheet 7.

Signed and Sealed this

Eighth Day of April 1980

[SEAL]

Attest:

SIDNEY A. DIAMOND

Attesting Officer

Commissioner of Patents and Trademarks